United States Patent
Baker et al.

(10) Patent No.: US 6,234,289 B1
(45) Date of Patent: May 22, 2001

(54) PNEUMATIC ANNULAR ACTUATOR

(75) Inventors: Evan R. Baker, Camas, WA (US); Kip E. Clohessy, Milwaukie; Fred L. Ewer, Clackamas, both of OR (US); Thomas W. Giacomini, Livonia, MI (US); Scott J. Pugliese, Portland, OR (US); O. Lance Scrivens, Clackamas, OR (US); Thomas F. Dunlap, West Linn, OR (US); Jon A. Bigley, Livonia, MI (US)

(73) Assignee: Warn Industries, Inc., Milwaukie, OR (US)

( * ) Notice: Subject to any disclaimer, the term of this patent is extended or adjusted under 35 U.S.C. 154(b) by 0 days.

(21) Appl. No.: 09/310,887

(22) Filed: May 17, 1999

Related U.S. Application Data

(63) Continuation-in-part of application No. 08/953,278, filed on Oct. 17, 1997, now Pat. No. 6,109,411, which is a continuation-in-part of application No. 08/651,384, filed on May 22, 1996, now Pat. No. 5,740,895.

(51) Int. Cl.[7] ............................. F16D 11/04; F16D 11/10; F16D 13/22

(52) U.S. Cl. ........................................ 192/69.41; 192/85 V

(58) Field of Search ....................... 192/69.41, 69.4, 192/85 C, 85 CA, 85 V, 91 R, 91 A

(56) References Cited

U.S. PATENT DOCUMENTS

| | | | |
|---|---|---|---|
| Re. 31,981 | 9/1985 | Lindbert | 180/247 |
| 4,373,604 | 2/1983 | Lunn | 180/247 |
| 4,381,828 | 5/1983 | Lunn | 180/247 |
| 4,407,387 | 10/1983 | Lindbert | 180/247 |
| 4,452,331 | 6/1984 | Lunn | 180/247 |
| 4,625,846 | 12/1986 | Gomez | 192/67 R |
| 4,627,512 | 12/1986 | Clohessy | 180/247 |
| 4,700,820 | 10/1987 | Hickmann | 192/48.5 |
| 4,960,192 | * 10/1990 | Kurihara | 192/69.41 |
| 5,044,479 | 9/1991 | Petrak | 192/49 |
| 5,105,900 | 4/1992 | Adler | 180/247 |
| 5,105,902 | 4/1992 | Wilson | 180/247 |
| 5,123,513 | 6/1992 | Petrak | 192/85 CA |
| 5,148,901 | * 9/1992 | Kurihara et al. | 192/69.41 |
| 5,176,591 | 1/1993 | Krisher | 475/252 |
| 5,219,054 | 6/1993 | Teraoka | 192/67 R |
| 5,386,898 | 2/1995 | Weilant | 192/67 R |
| 5,429,221 | 7/1995 | Tanzer | 142/85 V |
| 5,531,653 | 7/1996 | Barnholt | 475/234 |
| 5,535,869 | * 7/1996 | Bigley et al. | 192/69.41 |
| 5,586,632 | * 12/1996 | Bigley et al. | 192/69.41 |
| 5,740,895 | 4/1998 | Bigley | 190/69.41 |
| 5,839,986 | 11/1998 | Yamazaki | 475/230 |
| 6,015,361 | 1/2000 | Yamazaki | 475/230 |
| 6,016,883 | 1/2000 | Yamada | 180/247 |

* cited by examiner

Primary Examiner—Rodney H. Bonck
Assistant Examiner—Tisha D. Lewis
(74) Attorney, Agent, or Firm—Robert L. Harrington

(57) ABSTRACT

An annular actuator for moving a member axially to couple and un couple a drive member with a driven member of a vehicle drive train. The actuator encircles the drive and driven member. The actuator has a housing to which a diaphragm is mounted. A spring biases the diaphragm to move in one axial direction and withdrawal of air forces the diaphragm to move in the opposite axial direction. A shifting fork coupled to the diaphragm moves a clutch ring in the one axial direction to be coupled with only one of the drive and driven members and is coupled with both the drive and driven members when moved in the opposite direction. The actuator defines a sealed chamber that is totally non-rotatable with relative movement occurring between the shifting fork and the clutch ring.

18 Claims, 5 Drawing Sheets

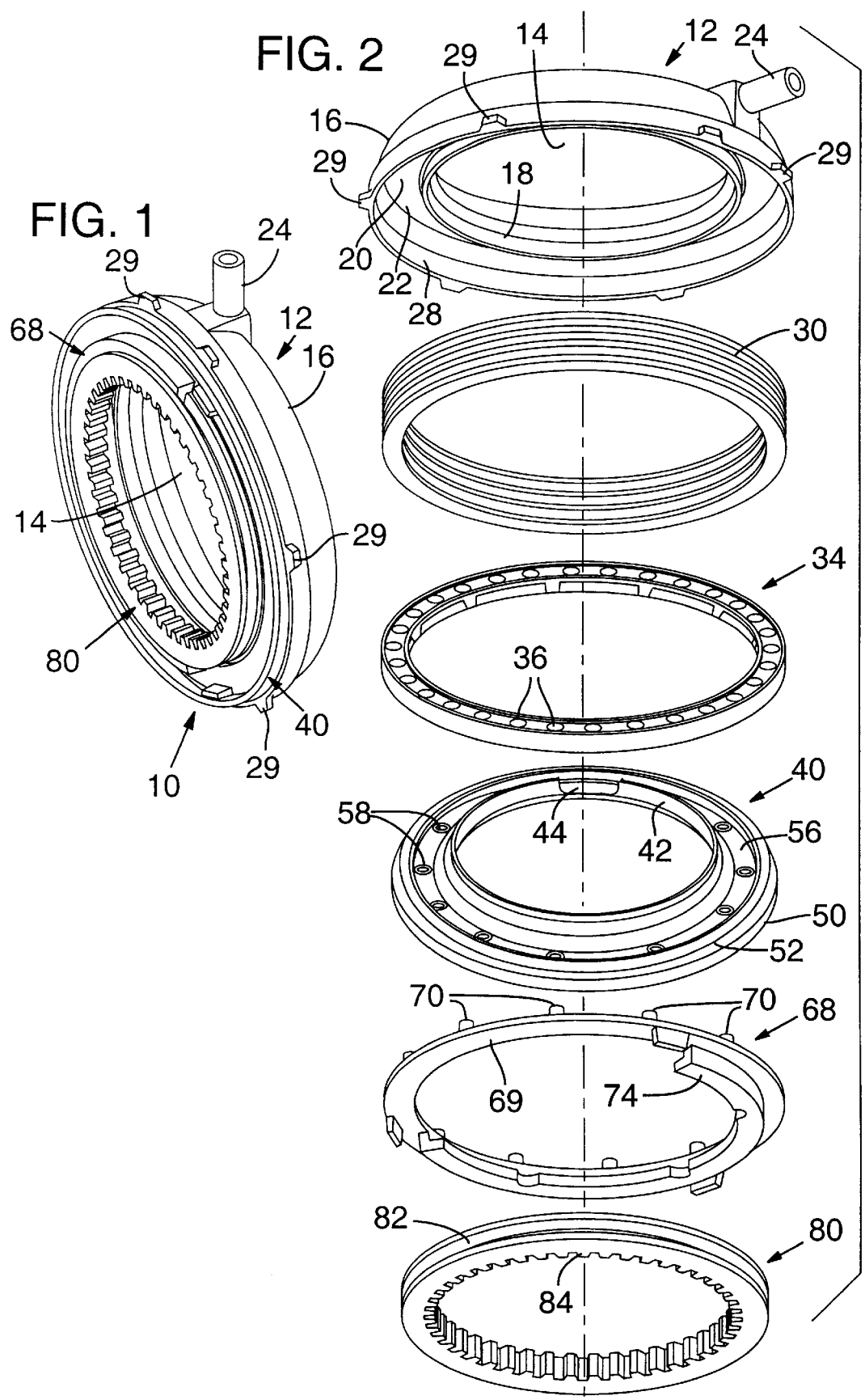

PNEUMATIC ANNULAR ACTUATOR

This application is a continuation-in-part of U.S. application Ser. No. 08/953,278 filed Oct. 17, 1997, now U.S. Pat. No. 6,109,411, which is a continuation-in-part of U.S. application Ser. No. 08/651,384 filed May 22, 1996 and now U.S. Pat. No. 5,740,895.

FIELD OF THE INVENTION

This invention relates to an actuator for initiating the shifting action of a clutch to affect engagement/disengagement of drive and driven shafts, and more particularly to such an actuator that is pneumatically actuated.

BACKGROUND OF THE INVENTION

In recent years it has become increasingly popular to provide vehicles with the ability to convert between two-wheel and four-wheel drive. As popularity has grown, so to have the many ways of affecting conversion. In one example there is a permanently driven drive line segment to the rear wheels of a vehicle, and a part-time driven drive line segment to the front wheels. The part-time drive line segment is simply disconnected/decoupled from the engine's drive shaft at the transmission or transfer case and that segment is rendered passive (undriven). There is often a second point of disconnection which may be at or near the differential (a center disconnect) or at both wheels.

There is a mechanical action that takes place to achieve each connection and disconnection as contemplated herein. Two shafts or drive line segments are in close relationship and a clutch ring that is permanently coupled to one shaft is slidable into engagement with the other shaft to couple (connect) the shafts and is slidable out of engagement with said other shaft to decouple (disconnect) the two shafts.

The sliding movement is achieved by what will here be referred to as an actuator. The actuator can be many types including, e.g., a shift lever, manual or electrically driven, it can be cam actuated and it can be pneumatic actuated. The present invention is directed to pneumatic actuators for clutch ring actuation.

Pneumatic actuators in general are not new. A pneumatic actuator is disclosed in U.S. Pat. No. 4,627,512, issued Dec. 9, 1986. This actuator was applied within a wheel hub for connecting/disconnecting the wheel from an axle. Another pneumatic actuator is disclosed in U.S. Pat. No. 5,044,479. One embodiment of this patent applies to the wheel hub of a vehicle and connects/disconnects an axle from the wheel hub, and another embodiment applied at a juncture between two axle portions located between the wheel hub and differential.

The pneumatic actuators as disclosed in these patents, and other similar actuators, function as claimed but they do have problems. In the '512 patent, the air chamber is formed between components that have relative rotation making sealing difficult. Furthermore, the negative air pressure typically available for actuation, e.g., from the vehicle's exhaust manifold, is limited and the designs of both the '512 patent and the '479 patent can be inadequate to produce the desired actuation.

For the above reasons at least in part, the pneumatic actuator for the clutch ring has not gained a high degree of acceptance. The objective of the present invention is to provide an improved pneumatic actuator that avoids the above problems.

BRIEF DESCRIPTION OF THE INVENTION

Whereas the clutch ring and components to be coupled are rotating, the annular actuator is designed to shift a non-rotating member (referred to as a fork) that is placed in contact with the rotating clutch ring. The contact between the rotating clutch ring and fork is designed to form a bearing that permits rotation of the clutch ring while the entire actuator remains static.

The annular configuration of the actuator which surrounds the juncture to be coupled enables the use of a greater surface area on which the air acts. Thus, the available air pressure (from the manifold) is being applied to the greater surface area and produces a greater accumulated force. Further, the force that is generated, because of its application at the greater radial distance from the clutch ring axis, produces greater torque and in combination with the greater surface area, the effective force applied to the clutch ring is substantially increased and adequately produces the desired clutch ring movement.

Having established a viable pneumatic actuator for a surrounding clutch ring, the inventors turned to the reduction of cost. The diaphragm that is used as the movable wall is made of material that conforms and seals against metal objects. Placing the diaphragm in an opening that needs otherwise to be sealed allows the diaphragm to serve dual purposes. Cost is also reduced by providing the other wall half of the air chamber from an existing component of the vehicle where available, the diaphragm forming the movable wall half.

Previously the other half (the fixed wall half) of a conventional air chamber had to be machined at the interface where the diaphragm had to grip the metal material. This is because a cast part is provided with tapered surfaces and machining was used to remove the taper. An elastomeric material such as a diaphragm will slide off a tapered surface. In one embodiment of the invention, the inventors cast into the elastomeric material a bendable metal stay that when properly placed is swagged at its end to provide mechanical gripping and holding of the diaphragm. Also, the elastomeric material is formed with a peripheral bead or beads that are collapsed against the tapered surface to assist gripping against the tapered surfaces.

With the increased surface area of the diaphragm and thus greater effective force applied by the intake manifold, the return spring force can also be increased to insure more reliable engagement and disengagement.

Having thus achieved a far more efficient air actuated clutch ring actuator, all or most of the actuators heretofore provided along the drive line are advantageously replaced with the present annular actuator. Those skilled in the art will appreciate the advantages and the numerous applications for the above pneumatic actuator upon reference to the following detailed description having reference to the accompanying drawings.

BRIEF DESCRIPTION OF THE DRAWINGS

FIG. 1 is a perspective view of an annular actuator of the present invention;

FIG. 2 is an exploded view of the annular actuator of FIG. 1;

DESCRIPTION OF THE PREFERRED EMBODIMENT

Figure 3:
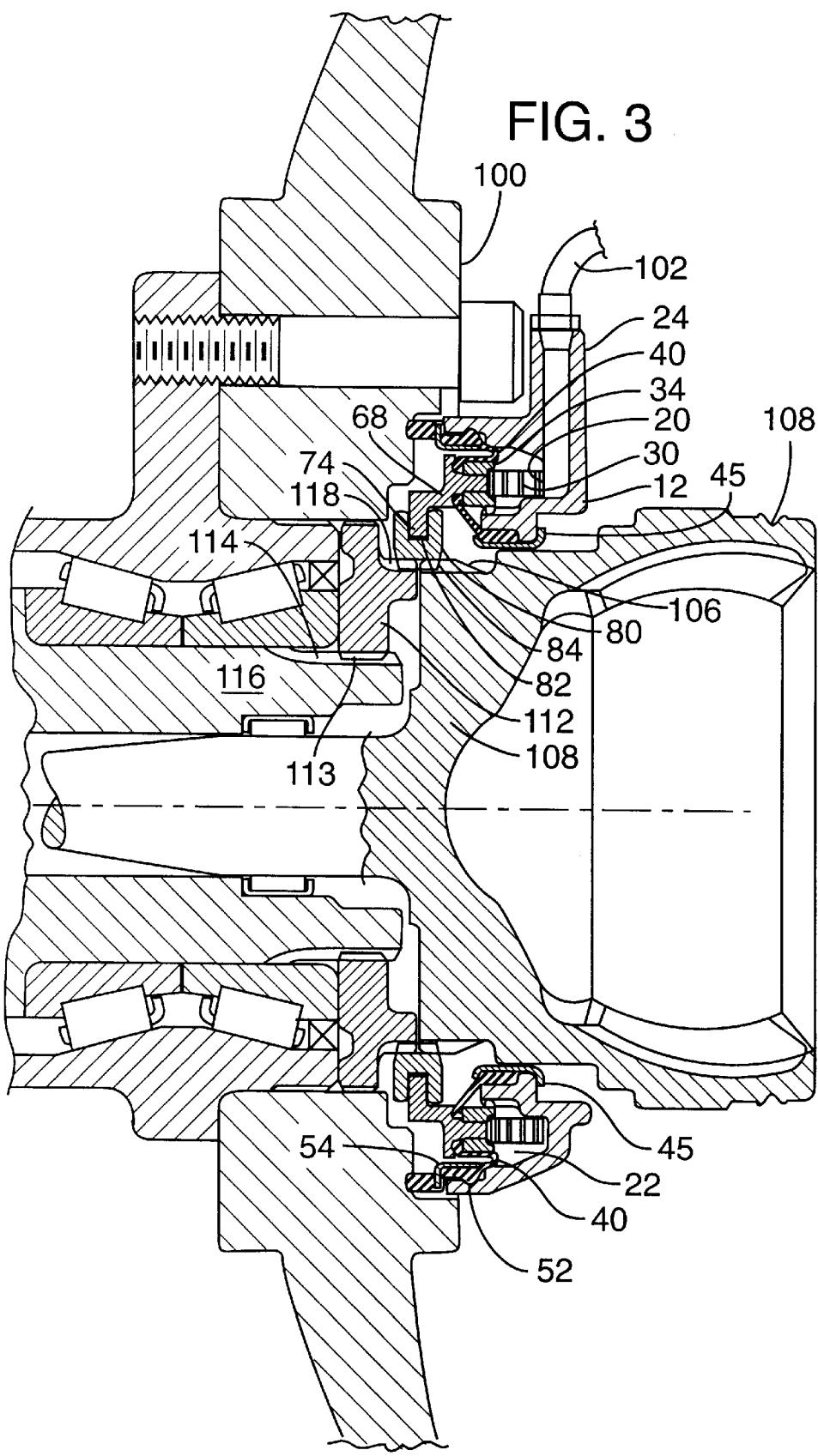
FIG. 3 is a cross sectional view of the annular actuator of FIG. 1 as applied to a wheel hub showing the engaged position.

FIGS. 1–4 illustrate one embodiment of an annular actuator 10 of the present invention. Referring to FIGS. 1 and 2, the actuator 10 has a housing 12 that is arranged to be fixedly mounted in a non-rotative manner. The actuator 10 is circular in configuration and has a center opening (bore) 14. A defined gas chamber 22 is formed within the housing 12 including a pliable diaphragm 40 which defines a movable wall of the chamber 22. The diaphragm 40 is biased axially outwardly by a biasing member such as a spring 30 which expands the chamber 22. The diaphragm 40 is moved axially inwardly by withdrawing a media from the defined chamber 22 which contracts the chamber.

Refer now to the exploded view of FIG. 2 of the actuator 10. The housing 12 of the actuator 10 is preferably molded and is circular in configuration resembling a ring like structure. The housing 12 has its center opening 14 defined by an inner wall 18 extending from a base portion 20. An outer circular wall 16 also extended from the base portion 20 in combination with the inner wall 18 and the base portion 20 define the fixed wall portion of the interior vacuum or gas chamber (cavity) 22.

The inner surface 28 of the wall 16 typically has a slight taper resulting from the molding operation. A port 24 communicates with the chamber 22 and is provided to input or exhaust air from the defined chamber 22. As shown in the figure, the outer wall 16 extends from the base portion 20 a greater distance than the inner wall 18. Projecting tabs 29 are provided to facilitate mounting the housing 12 to a member of a vehicle chassis.

A spring 30 is sized to fit within the chamber 22 between the walls 18 and 16 with one end of the spring 30 being in abutment with the base portion 20 of the housing 12. A piston 34 that is ring like in structure abuts the spring 30 when the components of the actuator 10 are assembled. The piston 34 has multiple bores 36 that are spaced and configured to receive posts or pins 70 of a shifting fork 68 as will be later explained.

The elastomeric pliable diaphragm 40 previously mentioned is configured to fit the housing 12 of the actuator 10. A rim 42 of the diaphragm 40 is sized to fit within the bore 14 (fitted against wall 18) of the housing 12. The rim 42 is reinforced by a metallic ring 44 that is molded integral with the rim 42. Upon installation, the rim 42 is press fit into the bore 14 which provides a seal (between the wall 18 and the diaphragm 40) to seal the chamber 22 of the housing 12. The end 45 of the ring 44 may be swaged over (see FIG. 3) to assure retention of the rim 42 in the bore 14. The outer diameter 50 of the diaphragm 40 has a projecting bead 52 formed around its periphery. A ring 54 molded integral with the diaphragm 40 (FIG. 3) supports the bead 52 and acts as a compression member to compress the bead 52 against the inner surface 28 of the housing 12 upon installation. When the diaphragm 40 is installed on the housing 12, the bead 52 will be in compressive contact with the inner surface 28 of the wall 16 which provides a seal (between the wall 16 and the bead 52 of the diaphragm 40) to seal the chamber 22 of the housing 12. A base portion 56 of the diaphragm 40 has multiple bores 58 that mate with the bores 36 of the piston 34.

A circular shifting fork 68 is mountable to the diaphragm 40 and the piston 34. The fork 68 has posts 70 extending from a base portion 69 that will extend through the bores 58 of the diaphragm 40 and fit in the matching bores 36 of the piston 34. The diaphragm 40 is thus sandwiched between the piston 34 and the shifting fork 68. The pins 70 of the fork 68 are fixedly mounted in the bores 36 of the piston 34 in a conventional manner such as by welding. The fork 68 has a projecting L-shaped arcuate section 74 extending from the base portion 69 that is configured to reside in a groove 82 of a clutch ring 80.

A circular clutch ring 80 has a peripheral groove 82 that will receive the formed section 74 of the shifting fork 68. The groove 82 and the formed section 74 provide a bearing section such that the clutch ring 80 may rotate relative to the shifting fork 68. The clutch ring 80 has internal splines 84 that are matable with splines of a drive and driven member of a vehicle.

Figure 4:
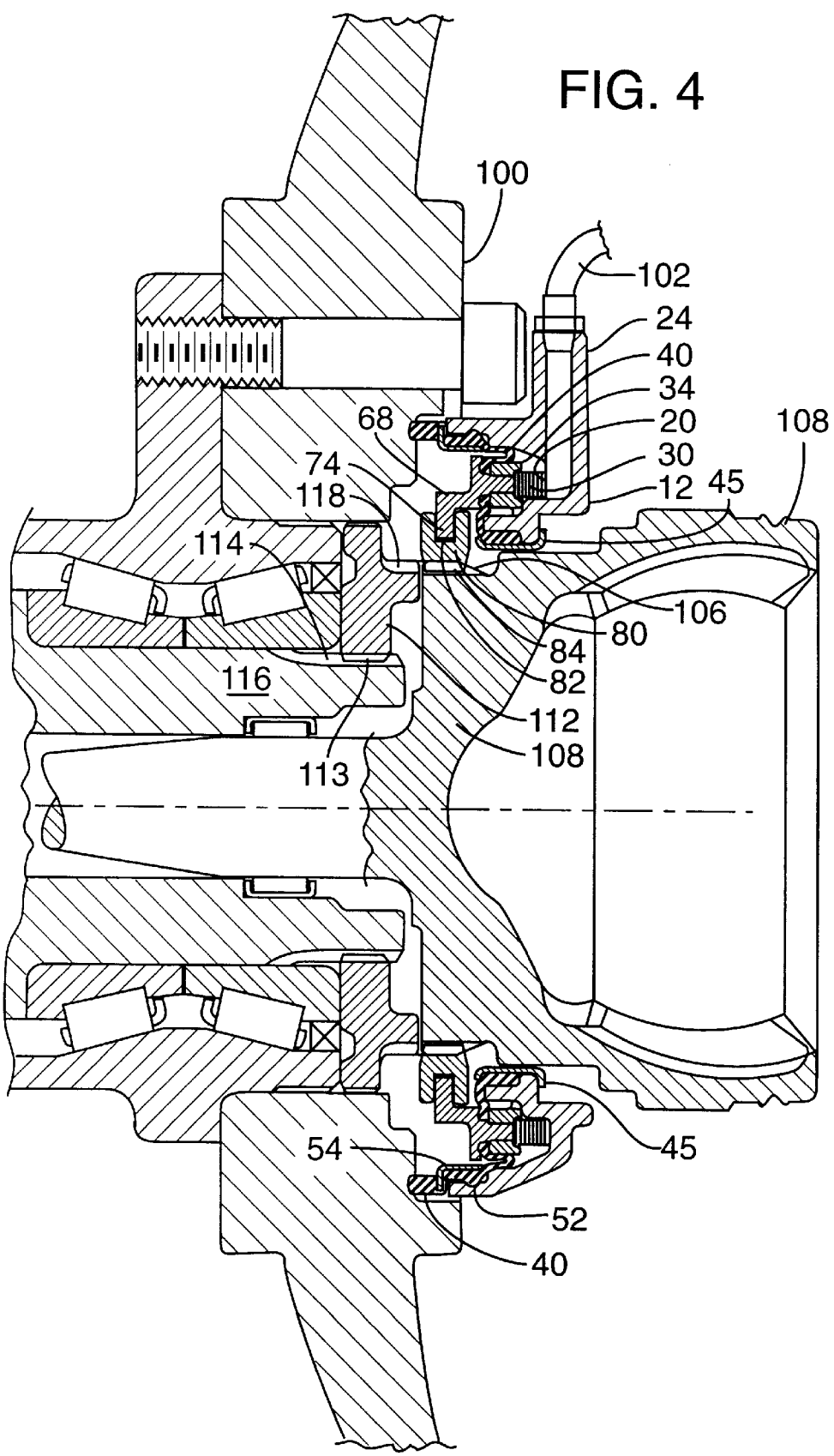
FIG. 4 is a view similar to FIG. 3 but showing the disengaged position.

Refer now to FIGS. 3 and 4 of the drawings which illustrate the annular actuator applied to a wheel hub. The housing 12 of the actuator is fixedly mounted to a knuckle 100 of the vehicle. An air line 102 is coupled to the port 24 of the housing 12 with the air line 102 being connected to an air source such as an intake manifold. The actuator is assembled as previously described with the clutch ring 80 being rotatable relative to the fork 68. As shown, the L-shaped section 74 of the fork 68 fits in the groove 82 of the clutch ring 80. The internal splines 84 of the clutch ring 80 are permanently engaged with splines 106 on axle 108. A coupler 112 having internal splines 113 is mounted on the wheel hub spindle 116 with the internal splines 113 of the coupler 112 being mated with the splines 114 of the wheel hub spindle 116. The coupler 112 has external splines 118 that are alignable with the splines 106 of the axle 108. The coupler 112 being in splined engagement with the hub spindle 116 rotates with the hub spindle 116.

The spring 30 of the actuator being captive between the base 20 and the piston 34 urges the assembly of the piston 34, diaphragm 40 and fork 68 to move axially away from the base 20 of the housing 12. This will move the clutch ring 80 axially along the splines 106 of the axle 108 and will urge the clutch ring 80 into engagement with the splines 118 of the coupler 112. This positions the clutch ring 80 in engagement with both the axle 108 and the coupler 112 (FIG. 3) and since the coupler 112 is in splined engagement with the hub spindle 116, the hub spindle 116 will be forced to rotate with the axle 108.

When air is withdrawn from the housing 12 via port 24, negative air pressure generated within the chamber 22 of the housing 12 will force the assembly of the piston 34, the diaphragm 40 and the fork 68 toward the base 20 of the housing 12. Negative air pressure is sufficient to compress the spring 30 and thus the clutch ring 80 will be moved out of engagement with the coupler 112 to be only engaged with the axle 108 as shown in FIG. 4.

A benefit of the assembly as described above and which will be observed from FIG. 4 is that the diaphragm 40 provides a seal as between the axle 108 and knuckle 100 which protects the wheel end from contamination.

Figure 5:
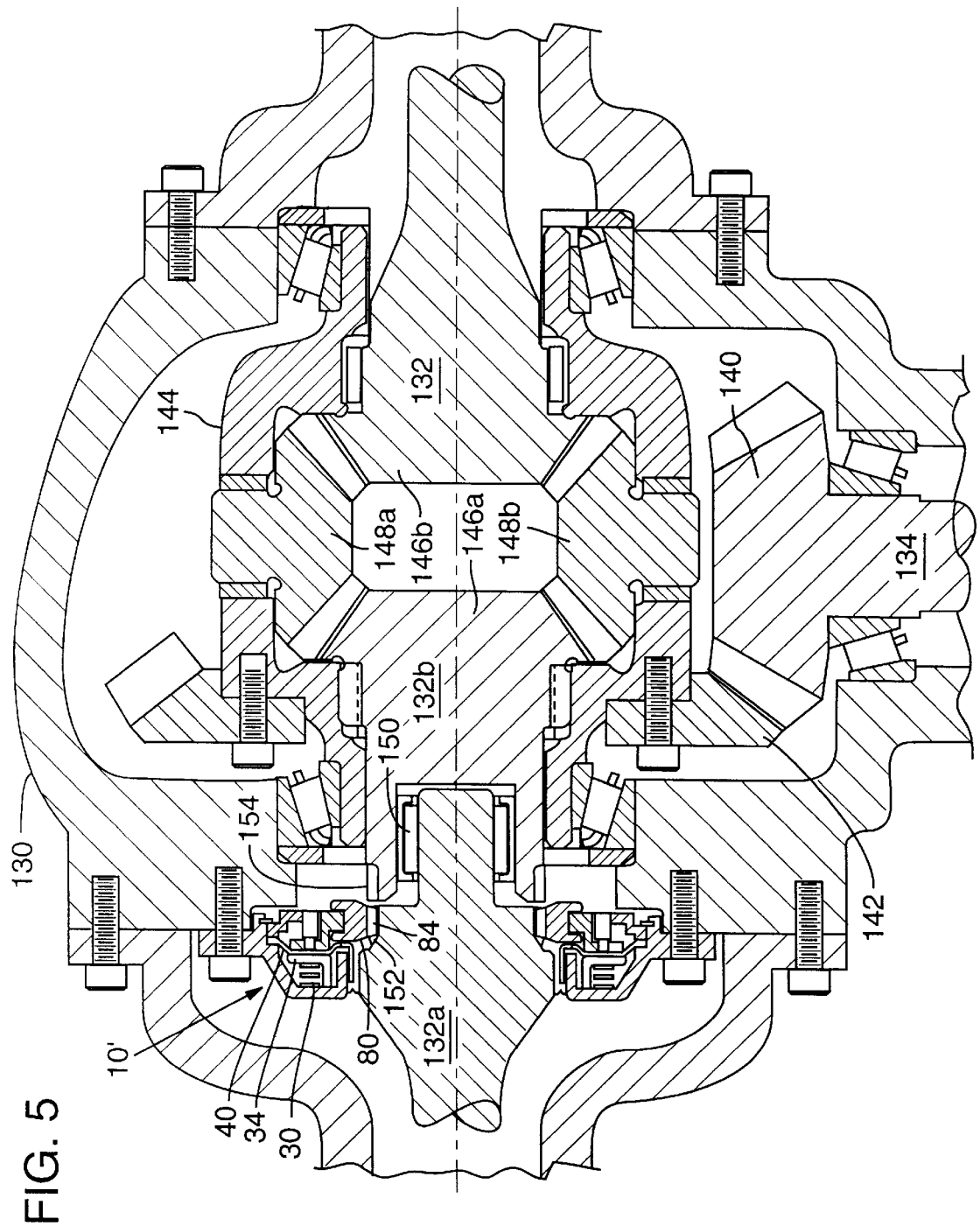
FIG. 5 is a view of an annular actuator similar to that of FIG. 1 but applied to a differential; and, FIG. 6 is a view of a pair of annular actuators similar to that of FIG. 1 and FIG. 5 but applied to a transfer case.

FIG. 5 illustrates a similar annular actuator 10' as applied to a differential assembly 130. The actuator 10' is provided to disconnect at least one of the axles of the assembly 130 indicated as 132a, 132b in the drawing. Basically a drive shaft 134 is rotatably driven to provide motive power to the wheels of the vehicle coupled to the axles 132. A pinion 140 mounted on the end of the drive shaft 134 is in mesh with a ring gear 142 that is mounted to a rotatable carrier 144. Rotation of the drive shaft 134 will thus rotate the pinion 140 which will cause rotation of the ring gear 142 and the carrier 144. Spider gears 146 are rotatably supported on the carrier 144 and are coupled to the axles 132 with one spider gear 146a being coupled to the left axle portion 132b and the other spider gear 146b being coupled to the right axle 132. The spider gears 146a and 146b are in mesh with spider gears 148a and 148b that are rotatably supported on the carrier 144. As is known, the differential assembly 130 allows one wheel (of the vehicle wheels connected to the axles) to overrun or run faster than the other wheel such as is required when going around a corner.

The actuator 10' is applied to at least one axle (32a, 32b) to provide for coupling that axle to the drive train of the vehicle or uncouple the axle from the drive train of the vehicle. When uncoupled, both axles are free to turn independent of drive shaft 134 to avoid driving the drive shaft 134 when the drive shaft is uncoupled at the transfer case.

As shown in FIG. 5, one axle is split to provide an axle portion 132a and an axle portion 132b. A spider gear 146a is mounted on the end of the axle portion 132b and is rotatably supported in the carrier 144. The axle portion 132a is aligned with the axle portion 132b and is supported on bearings 150 interposed between the axle portions 132a and 132b. Splines 152 are formed on the axle portion 132a and splines 154 are formed on the end of the axle portion 132b.

The actuator 10' is fixedly mounted to the housing of the differential assembly 130 such that a clutch ring 80 surrounds the axle portions 132a and 132b. The clutch ring 80 is normally biased by the spring 30 of the actuator 10' to be in engagement with both the axle portions 132a and 132b. The internal splines 84 of the clutch ring 80 will be in engagement with the splines 152 of the axle portion 132a and the splines 154 of the axle portion 132b. When air is withdrawn from the housing of the actuator 10', the spring 30 will be compressed by the action of the diaphragm 40 and the piston 34 to thus move the clutch ring 80 out of engagement with the splines 154 on the axle portion 132b. This will disconnect the axle portion 132a from the axle portion 132b.

Disconnecting the axle portion 132b from the axle portion 132a in effect disconnects the wheel coupled to the axle portion 132a from the drive line of the vehicle. When the drive shaft 134 is uncoupled from the power line of the vehicle such as by shifting the transfer case into a neutral position and the vehicle is propelled along the roadway, the wheel coupled to the right axle 132 will simply rotate its spider gear 46b which is in mesh with the spider gears 148a and 148b and the only rotation of elements will be the right axle 132, the spider gears 146, the spider gears 148 and the axle portion 132b. The large mass of the carrier 144 will resist rotation and thus rotation will not be imparted to the drive shaft 134. It will be understood that this condition is permitted because axle portion 132b is allowed to rotate in a direction opposite to that of axle portion 132a.

Figure 6:
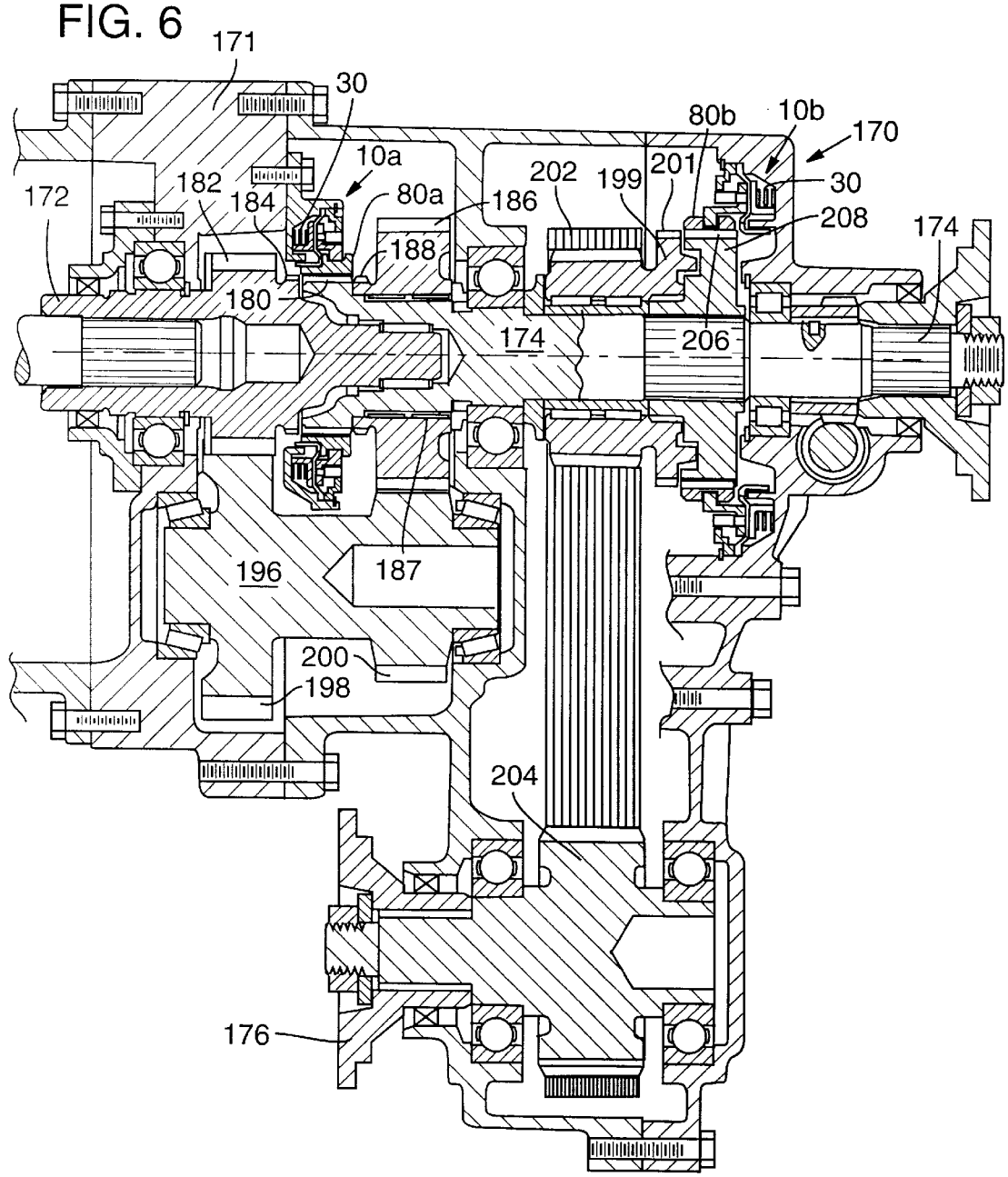

FIG. 6 illustrates a four-wheel drive transfer case 170. The transfer case 170 is of the type that is shiftable to provide two-wheel drive or four-wheel drive for a vehicle. The transfer case also has gearing to provide a high and low range output to the front and rear wheels of the vehicle.

The transfer case has an input shaft 172 that is rotatably driven by the vehicle engine to provide the motive power for the vehicle wheels. The input shaft 172 may be coupled directly to an output shaft 174 or may be coupled to the output shaft 174 through a gear train which will provide the low range of the transfer case. The shaft 174 provides a rotative power for one set of wheels of the vehicle and in this example the shaft 174 provides rotative power to the rear wheels of the vehicle. The shaft 174 is further connectable and un connectable from an auxiliary shaft 176. The shaft 176 provides a motive power for the front wheels of the vehicle. The transfer case 170 thus is arranged to provide motive power to the rear wheels only of the vehicle or to provide motive power to the front and rear wheels of the vehicle. Additionally the transfer case 170 is shiftable between a high range and low range for both front and rear wheels.

An actuator 10a provides the shift mechanism for shifting the transfer case between the high range and low range and additionally, another actuator 10b is provided to shift the transfer case between two-wheel drive and four-wheel drive.

Actuator 10a is fixedly mounted to the housing 171 of the transfer case 170. A clutch ring 80a is permanently and slidably mounted on splines 180 of output shaft 174 and is slidably movable between engagement with either the splines 184 of gear 182 or splines 188 of gear 186. (It is shown in the intermediate position for convenience of illustration only.) Gear 182 is fixedly mounted to and directly driven by the input shaft 172. Gear 186 is rotatably mounted on the output shaft 174 and is indirectly and permanently driven by gear 182 as will be explained. The spring 30 of the actuator 10a normally biases the clutch ring 80a into engagement with the splines 188 on the gear 186. When air is withdrawn from the chamber of the actuator 10a, the diaphragm and piston in combination will compress the spring 30 and the clutch ring 80a will be moved out of engagement with splines 188 and into engagement with the splines 184 on the gear 182. This latter position of the clutch ring 80a couples the input shaft 172 directly to the output shaft 174 causing input shaft 172 and the output shaft 174 to rotate in unison.

The indirect permanent driving connection between gear 186 and gear 182 is now explained. An auxiliary shaft 196 has a gear 198 fixedly mounted thereon and in mesh with the gear 182 mounted to the input shaft 172. Another gear 200 which is integral with and thus fixedly mounted on the axillary shaft 196 is in mesh with the gear 186 rotatably mounted on the output shaft 174. The gear 182 in mesh with the gear 198 rotates the shaft 196 and thus the gear 200. This produces indirect (gear reduction) rotation of the gear 186 whenever input shaft 172 is rotated. Thus, when the clutch ring 80a has been moved into engagement with the splines 184 of the gear 182, the gear 186 drives the output shaft 174 but at a reduced rate as compared to the direct drive as previously described.

When the actuator 10a is in static state, that is the pressure within the chamber of the actuator 10a is at ambient pressure, the spring 30 will force the clutch ring 80a to move along the splines 180 on the output shaft 174 and into engagement with the splines 188 on the gear 186. This will couple the gear 186 with the shaft 174. The clutch ring 80a will, however, be out of engagement with the splines 184 on the gear 182. The input shaft 172 will rotate at a different rate than the output shaft 174 due to the gear ratio of the gear 182 in mesh with the gear 198 and in turn the gear 200 in mesh with the gear 186. This provides for the low range setting. That is, the output shaft 174 will rotate at a lesser rate than the input shaft 172.

Another actuator 10b is fixedly mounted to the housing of the transfer case and strategic to the output shaft 174. A gear 199 is rotatively mounted on the output shaft 174 and drive chain 202 is coupled to gear 199. The drive chain 202 is also coupled to a gear 204 on output shaft 176 which is coupled to the front drive train of the vehicle. Actuator 10b includes a clutch ring 80b that is slidably movable on splines 206 of a gear 208. Gear 208 is fixedly mounted to output shaft 174.

When air is withdrawn from the chamber of actuator 10*b*, the spring 30 will be compressed and the clutch ring 80*b* will only be engaged with splines 206 of gear 208. This isolates the drive mechanism from shaft 176 and the vehicle is in two wheel drive mode.

When the negative air pressure of the chamber of the actuator 10*b* is released the spring 30 will urge the clutch ring 80*b* to slide on the splines 206 to become engaged with the splines 201 of gear 199. This couples the output shaft 174 to the front wheel drive shaft 176. This provides for four-wheel drive mode.

Those skilled in the art will recognize that modifications and variations may be made without departing from the true spirit and scope of the invention. The invention is therefore not to be limited to the embodiments described and illustrated but is to be determined from the appended claims.

The invention claimed is:

1. A vehicle comprising:
   a drive line, said drive line separated into adjacent drive line portions defining a juncture, a non-rotating housing adjacent the juncture, a clutch ring surrounding the drive line and permanently but slidably coupled to one of the drive line portions and slidably coupled onto and off of the other of the drive line portions for locking and unlocking the portions together;
   a ring-shaped pneumatic actuator surrounding said drive line and attached to the non-rotating housing adjacent the juncture, said actuator having opposed ring-shaped walls defining an annular expandable/contractible gas chamber, one of said walls being movable and the other wall secured to the housing whereby expansion and contraction urges movement of the movable wall, a bearing member connected to said movable wall and in rotatable bearing contact with the clutch ring for moving the clutch ring axially into and out of engagement with said other drive line portion; and
   a biasing member urging the movable wall in one direction and a gas source connected to the gas chamber to selectively pressurize the gas chamber and overcome the biasing member to move the movable wall in the opposite direction for selective movement of the bearing member and clutch ring.

2. A vehicle as defined in claim 1 wherein the fixed wall of the gas chamber is integral with the housing.

3. A vehicle as defined in claim 1 wherein the fixed wall of the ring-shaped gas chamber is molded with a tapered annular wall defining a lip, and the movable wall is an elastomeric diaphragm having a periphery that grips the tapered annular wall, and a swagable rim molded into the periphery of the diaphragm and fitted over the lip of the tapered annular wall with the swagable rim swaged around said lip to produce gripping of the diaphragm to the annular wall.

4. A vehicle as defined in claim 3 wherein the fixed wall of the ring-shaped gas chamber is molded with a tapered annular wall, and the movable wall is an elastomeric diaphragm fitted to the tapered wall, said diaphragm provided with a peripheral bead that engages the tapered wall, and a compression member compressing the bead against the tapered wall to produce gripping of the diaphragm to the fixed wall.

5. A vehicle as defined in claim 1 wherein the gas source produces negative pressure to collapse the air chamber and force retraction of the clutch ring, and said biasing member is an annular spring contained in the gas chamber urging expansion of the gas chamber, said gas source providing sufficient force to overcome the spring for retraction of the movable wall, bearing member and clutch ring, and said spring having sufficient force upon release of the force of the gas source to urge return movement of the movable wall, bearing member and clutch ring.

6. A method of providing actuation to a clutch ring for coupling and decoupling adjacent drive line components of a vehicle which forms a drive line juncture, said method comprising:
   locating the juncture adjacent a fixed housing;
   providing an annular vacuum chamber that surrounds the drive line and is fixedly connected to the fixed housing, the vacuum chamber having a fixed wall and a movable wall that moves toward and away from the fixed wall and thereby produces coupling and decoupling of the drive line components;
   continuously urging through spring force separation of the movable wall from the fixed wall for coupling the components and selectively removing air from the chamber to produce a vacuum for urging the walls together for decoupling;
   providing a non-rotatable bearing member connected to the movable wall and bearing against the rotatable clutch ring to produce shifting of the clutch ring.

7. A vehicle as defined in claim 1 wherein the non-rotating housing is a knuckle for a vehicle wheel, and the adjacent drive line portions are a wheel spindle having splines on a circumferential exterior of said wheel spindle, and an axle portion having splines on a circumferential exterior of said axle portion mated to the splines of the spindle, said clutch ring coupled to one of said wheel spindle and axle portion and movable into coupling engagement with the other of said wheel spindle and said axle portion for coupling and uncoupling the vehicle wheel to the axle.

8. A vehicle as defined in claim 1 wherein the non-rotating housing is a differential casing having a differential gear assembly transmitting balanced drive power from a drive shaft to right and left wheel axles, one of said wheel axles separated into two axle portions in end-to-end relation and providing said drive line portions, one axle portion extended into engagement with said differential gear assembly and the other axle portion extended to a wheel, said axle portions provided with exterior mated splines; and the clutch ring engaging the splines of one of said axle portions and movable into engagement with the splines of the other of said axle portions for coupling and uncoupling the axle portions.

9. A vehicle as defined in claim 1 wherein the non-rotating housing is a transfer case having an input drive shaft, a first output drive shaft extending to rear wheels and a second output drive shaft extending to front wheels, one of said output drive shafts directly connected to the input drive shaft, and a first drive shaft portion driven by one of said input drive shaft and said one of said output drive shafts, and a second drive shaft portion drivingly engaged with the other of said output drive shafts, said first and second drive shaft portions providing said drive line portions whereby the clutch ring selectively engages and disengages said drive shaft portions to convert between two-wheel and four-wheel drive.

10. A vehicle as defined in claim 1 wherein the non-rotating housing is a transfer case having an input drive shaft and an output drive shaft, a coupling configuration provided on an exterior portion of said output drive shaft, a first input drive shaft portion and a second input drive shaft portion, each input drive shaft portion having a coupling configuration mated to the coupling configuration of said output drive shaft portion, said output drive shaft portion positioned between said first and second input drive shaft portions and said clutch ring slidingly mounted on said output drive shaft portion for slidable engagement with either of said first and second input drive shaft portions, and at least one gear assembly provided between said input drive shaft and one of said input drive shaft portions to provide gear reduction to said at least one of said input drive shaft portions relative to the other of said input drive shaft portions whereby slidable movement of the clutch ring between said input drive shaft portions produces low and high range drive powers to said output drive shaft.

11. A chassis for a vehicle comprising:
   a vehicle drive train, a vehicle chassis rotatably supporting the drive train, said drive train extended from an engine to a wheel, and a point of separation in the drive train whereat drive power can be selectively provided to the wheel;
   a drive component and a driven component of said drive train in close adjacency and defining said point of separation in the drive train and further defining an axis of rotation, a non-rotating support portion of the vehicle chassis at the point of separation;
   an actuator mounted to the non-rotating support portion and a rotatably fixed bearing member carried by the actuator, a power source, said actuator having selective actuation responsive to on/off input from said power source for selective, slidable movement of the bearing member along the defined axis in one direction, and a biasing member providing constant pressure for return movement of the bearing member when the power source is off;
   splines carried by the drive and driven components of the drive train at the point of separation and a clutch ring engaged with the splines of one of the components and slidable into engagement with the splines of the other component for interconnection of the components, said clutch ring connected to the bearing member and rotatably movable and not axially movable relative thereto whereby axial movement of the bearing member by the actuator induces sliding movement of the clutch ring into connection/disconnection of the drive and driven components selectively.

12. A chassis as defined in claim 11 wherein the actuator includes an annular ring defining an annular expandable/contractible chamber and the power source is a media source connected to the annular chamber for inserting and retracting media from the chamber and thereby expanding and contracting said chamber, the expansion and contraction of the chamber producing axial movement of a portion of said chamber and said bearing member provided on the axially movable portion of the chamber for producing selective axial movement of the bearing ring and clutch ring.

13. A chassis for a vehicle comprising:
   a vehicle drive line rotatably supported by the chassis;
   an actuating device for a coupling mechanism in the vehicle drive line;
   a first component and a second component of the drive line forming a juncture in the vehicle drive line whereat the components are rotatably independent of one another, said juncture provided adjacent a non-rotatable member of the chassis;
   an actuator ring surrounding the juncture and secured to the non-rotatable member, an expandable circular chamber within said actuator ring and a media source connected to said chamber for producing one of expanding and contracting said chamber, and a spring producing the other of said expanding and contracting said chamber whereby said expanding and contracting produces axial movement of a portion of said chamber; and
   a clutch ring surrounding said juncture and movable between a position of engagement with one only of said first and second components and into a position of engagement with both of said first and second components, said clutch ring connected to the movable portion of said chamber and being selectively moved by the input and withdrawal of media to the chamber between said positions of engagement.

14. A chassis as defined in claim 13 wherein the expandable circular chamber includes a fixed wall portion and an expandable diaphragm fixedly secured to said fixed wall portion and cooperatively forming the expandable chamber there between, said media causing axial deflation of the diaphragm, a bearing member interposed between the expandable circular chamber and the clutch ring, said bearing member connected to the diaphragm and non-rotative relative to the diaphragm and axially movable with axial deflation of the diaphragm, said clutch ring rotatable relative to the bearing member and movable axially by the movement of the bearing member.

15. A pneumatic annular actuator mounted to a non-rotating component of a vehicle and arranged to move a clutch ring between positions of engagement and disengagement for connecting and disconnecting adjacent drive line portions of the vehicle, said actuator comprising:
   an annular hollow ring-shaped housing defining an axis and having an annular rigid component forming one side of the ring-shaped housing and an annular flexible component forming an opposing side of the ring-shaped housing, said components secured together to cooperatively define a sealed expandable and deflatable chamber configured to permit axial back and forth movement of a movable wall portion of the housing;
   a bearing member and a clutch ring, said bearing member coupled to said movable wall portion for axial movement with the wall portion, and said bearing member rotatably coupled to said clutch ring to effect axial movement of said clutch ring while permitting relative rotating movement; and
   a gas source connected to the chamber to selectively pressurize said chamber and induce one of expansion and deflation of said chamber and thereby axial movement of the clutch ring.

16. A pneumatic annular actuator as defined in claim 15 wherein an annular piston is secured to the flexible component and provides the movable wall portion of the housing.

17. A pneumatic annular actuator as defined in claim 15 wherein a spring engages the movable wall portion to provide spring pressure that induces the other of expansion and deflation of said chamber, the pressure induced by said gas source overpowering the spring pressure when selectively pressurized.

18. A pneumatic annular actuator as defined in claim 17 wherein the gas source produces negative air pressure to induce deflation, and the spring is mounted within the chamber and urges expansion of the chamber.

* * * * *